United States Patent
Li et al.

(10) Patent No.: US 12,398,049 B2
(45) Date of Patent: Aug. 26, 2025

(54) MAGNETIZATION CONTROL APPARATUS FOR PREVENTING CLOGGING OF DRIP IRRIGATION SYSTEM IRRIGATOR AND CONTROL METHOD THEREOF

(71) Applicant: China Agricultural University, Beijing (CN)

(72) Inventors: Yunkai Li, Beijing (CN); Yang Xiao, Beijing (CN); Zeyuan Liu, Beijing (CN); Yufei Lin, Beijing (CN)

(73) Assignee: China Agricultural University (CN)

( * ) Notice: Subject to any disclaimer, the term of this patent is extended or adjusted under 35 U.S.C. 154(b) by 493 days.

(21) Appl. No.: 17/879,236

(22) Filed: Aug. 2, 2022

(65) Prior Publication Data

US 2023/0202867 A1 Jun. 29, 2023

(30) Foreign Application Priority Data

Dec. 24, 2021 (CN) .......................... 202111598560.8

(51) Int. Cl.
*C02F 1/00* (2023.01)
*A01G 25/02* (2006.01)
*C02F 1/48* (2023.01)

(52) U.S. Cl.
CPC .............. *C02F 1/008* (2013.01); *A01G 25/02* (2013.01); *C02F 1/487* (2013.01);
(Continued)

(58) Field of Classification Search
None
See application file for complete search history.

(56) References Cited

U.S. PATENT DOCUMENTS

| 10,763,021 | B1 * | 9/2020 | Parisien | .................... H01F 7/20 |
| 2013/0192682 | A1 * | 8/2013 | Freese | ................. E21B 43/2401 137/13 |
| 2016/0318079 | A1 * | 11/2016 | Rossi | ..................... B03C 1/286 |

* cited by examiner

*Primary Examiner* — Richard C Gurtowski
(74) *Attorney, Agent, or Firm* — Emerson, Thomson & Bennett, LLC; Roger D. Emerson; Matt J. Wilson

(57) ABSTRACT

The present disclosure belongs to the technical field of agricultural high-efficiency water-saving irrigation, and relates to a magnetization control apparatus for preventing clogging of a drip irrigation system irrigator and a control method thereof. The method includes: pumping irrigation water from the water source project through the first water pump, passing through the drip irrigation head control hub, and entering the pool; pumping the irrigation water through the second water pump, flowing through the first copper valve, and entering the magnetized pipe; the irrigation water after treated by the magnetizer returning to the pool through the flow rate monitor and the first valve in turn; when water quality of the irrigation water meets water quality requirements entering the capillary pipes, turning off the second water pump and stopping the cyclic magnetization treatment; the third water pump turning on; pumping the irrigation water after the cyclic magnetization treatment from the pool through the third water pump, and filtering through the mesh filter, entering the branch pipe and the capillary pipes through the second valve again; and the irrigation water flowing from the irrigators for irrigation. The present disclosure effectively solves the clogging problem of the drip irrigation system irrigator, has the advantages of cleanliness and high-efficiency; improves crop yield and quality, has a simple operation mode, and is convenient for users to operate.

11 Claims, 8 Drawing Sheets

(52) U.S. Cl.
CPC .. *C02F 2201/009* (2013.01); *C02F 2201/483* (2013.01); *C02F 2209/40* (2013.01)

MAGNETIZATION CONTROL APPARATUS FOR PREVENTING CLOGGING OF DRIP IRRIGATION SYSTEM IRRIGATOR AND CONTROL METHOD THEREOF

CROSS-REFERENCE TO RELATED APPLICATIONS

The present disclosure claims priority to Chinese Application No. 202110621661.6 filed on Jun. 3, 2021, Chinese Application No. 202121240972.X filed on Jun. 3, 2021, Chinese Application No. 202121241920.4 filed on Jun. 3, 2021, and Chinese Application No. 202121242142.0 filed on Jun. 3, 2021, and entitled "ALL-TERRAIN VEHICLE", all of which are incorporated herein by reference in their entirety.

TECHNICAL FIELD

The present disclosure belongs to the technical field of agricultural high-efficiency water-saving irrigation, relates to a magnetization control apparatus for preventing clogging of a drip irrigation system irrigator and a control method thereof, in particular to a magnetization control apparatus for preventing clogging of a drip irrigation system irrigator and increasing crop yield and quality and a control method thereof.

BACKGROUND

At present, drip irrigation is one of the most water-saving and high-efficiency irrigation technologies. It has broad application prospects, and has become an important approach for modern agriculture to achieve water-saving and high-efficiency production. With the intensification of water resource shortage, inferior water sources such as reclaimed water, brackish water, surface water of slightly polluted rivers, lakes and reservoirs and aquaculture wastewater are also often used as drip irrigation water sources. However, these inferior water sources usually contain a large number of microorganisms, salt ions and algae, etc., which aggravates the clogging problem of key component irrigators in a drip irrigation system, and greatly reduces irrigation uniformity of the drip irrigation system. In severe cases, an entire drip irrigation system may be scrapped. Therefore, the quality of a solution to the clogging problem directly determines the service life and application benefits of a drip irrigation project.

How to effectively control the formation of fouling inside the irrigator is the key to solving the clogging problem of the irrigator. Although traditional chemical methods such as acid addition and chlorine addition can respectively control chemical fouling and biological fouling, these methods require repeated application, are costly, and may easily lead to environmental pollution and crop yield reduction. In addition, the fouling inside the irrigator is a composite form of biological fouling and chemical fouling, which is called: composite fouling. A control effect of acid addition or chlorine addition on the composite fouling is poor. Magnetic treatment technology may integrate many functions such as scale inhibition, sterilization and algae killing, and has advantages in terms of environmental protection and reduction of production investment costs, which are not available in the clogging control methods of the irrigator such as acid addition and chlorine addition. In addition, magnetic treatment technology has obvious effects such as on promoting seed germination, improving the survival rate of seedlings, improving soil, and increasing crop yield and improving quality. In recent years, with the intensification of water resource shortage and the gradual improvement of environmental protection requirements, magnetic treatment technology has been widely used in water supply systems, oil exploration, machinery manufacturing and metallurgy and other fields. For example, Yu Rong and Zhou Xintong of Xi'an Polytechnic University disclosed a patent titled: "A Kind of Magnetic Humidifier with Sterilization Descaling Function" (patent application number: CN201711246710.2), the magnetic humidifier has the functions of sterilizing and descaling, oxidizing the air and protecting the machine. Another example is that Yuan Yuan and Ren Quanwen of Beijing Zhongchuang Longyuan Environmental Protection Technology Co., Ltd. fully disclosed a patent titled: "Permanent Magnetization Apparatus" (patent application number: CN201810387159.1), the permanent magnetization apparatus can improve the solubility of limescale to remove chemical fouling. However, at present, there is no magnetization equipment for the clogging control needs of agricultural drip irrigation system irrigators, and it is still unclear how to integrate the magnetic treatment technology with agricultural drip irrigation technology, what's more, there is a lack of suitable magnetization technology application mode for the drip irrigation system.

Based on this, on the basis of the existing technology and application process, the present disclosure proposes a magnetization control apparatus for clogging of drip irrigation system irrigator and a suitable operation mode thereof, specifically is: based on an operation mode and water source characteristics of a drip irrigation system, a development method of a DC pulse magnetizer applied in the drip irrigation system is proposed, and an evaluation system for a treatment effect of the magnetization equipment on the drip irrigation water source is constructed. The need for clogging control of the irrigator and the influence on crop growth are comprehensively considered, and a suitable operation method of the magnetization equipment in the drip irrigation system is clarified. Magnetization treatment makes fouling looser and easy to be washed away by water flow, and irrigator clogging may be further controlled combined with capillary flushing and irrigator screening. The method may effectively solve the problems such as the clogging of the irrigator caused by the use of inferior water sources for drip irrigation in farmland and safe operation of the drip irrigation system.

SUMMARY

In order to overcome a series of defects in the prior art, the objective of the present disclosure is to provide a magnetization control apparatus for preventing clogging of a drip irrigation system irrigator and a control method thereof, so as to solve the problems proposed in the above Background section. A specific technical solution is as follows.

A magnetization control apparatus for preventing clogging of a drip irrigation system irrigator,
the magnetization control apparatus is configured to: prevent the clogging of the drip irrigation system irrigator and improve crop yield and quality;
the drip irrigation system includes: a water source project 1, a water transmission and distribution pipe network, several irrigators 17, a first water pump 2, a drip irrigation head control hub 3 and the magnetization control apparatus;
the magnetization control apparatus includes: a pool 4, a second water pump 5, a first copper valve 6, a magnetized pipe 7, a magnetizer 9, a flow rate monitor 10, a first valve 11, a sensor 12 and an automatic control apparatus 13;

the water transmission and distribution pipe network includes: a third water pump 14, a mesh filter 15, a second valve 16, a speed regulating apparatus 18, several main pipes 37, a branch pipe 38 and several capillary pipes 39;

the water source project 1 is connected to one end of the first water pump 2 through the main pipe 37, and the other end of the first water pump 2 is connected to an inlet of the drip irrigation head control hub 3 through the main pipe 37; an outlet of the drip irrigation head control hub 3 is connected to an inlet of the pool 4 through the main pipe 37;

the pool 4 is connected to one end of the second water pump 5 through the main pipe 37, and the other end of the second water pump 5 is connected to one end of the first copper valve 6 through the main pipe 37; the other end of the first copper valve 6 is connected to one end of the magnetized pipe 7; the other end of the magnetized pipe 7 is connected to one end of the flow rate monitor 10 through the main pipe 37, the other end of the flow rate monitor 10 is connected to one end of the first valve 11 through the main pipe 37, and the other end of the first valve 11 is connected to the pool 4 through the main pipe 37;

the sensor 12 is located in the pool 4, and the automatic control apparatus 13 is connected to the sensor 12, the second water pump 5 and the third water pump 14;

an outlet of the pool 4 is connected to one end of the third water pump 14 through the main pipe 37, and the other end of the third water pump 14 is connected to one end of the mesh filter 15 through the main pipe 37; the other end of the mesh filter is connected to one end of the second valve 16 through the main pipe 37, the other end of the second valve 16 is connected to the branch pipe 13, and the branch pipe 13 is connected to one ends of the several capillary pipes 39; and the other ends of the several capillary pipes 39 are connected to the speed regulating apparatus 18;

several irrigators 17 are provided on each of the capillary pipes 39;

the magnetizer 9 includes: a pipe coil and a magnetization generating apparatus;

the pipe coil is wound on the magnetized pipe 7;

one end of the pipe coil is connected to one end of the magnetization generating apparatus, and the other end of the pipe coil is connected to the other end of the magnetization generating apparatus; and the first copper valve 6 is configured to: adjust flow rate changes.

On the basis of the above technical solution, the drip irrigation head control hub 3 includes: a water pump, a power machine, a control device, a filtering apparatus, a fertilization apparatus, and a measurement and protection device; and the drip irrigation head control hub 3 is configured to: pump and pressurize water from the water source project 1, apply fertilizer liquid, and deliver the water and the fertilizer to the water transmission and distribution pipe network on time and by volume after water quality filtration.

On the basis of the above technical solution, the magnetization control apparatus further includes: a solar panel 8;

the magnetization control apparatus is connected to the solar panel 8; and the solar panel 8 is configured to: provide electrical energy for the magnetization generating apparatus.

On the basis of the above technical solution, the magnetizer 9 is: a DC pulse variable frequency magnetizer;

an input voltage of the DC pulse variable frequency magnetizer is: 220V/50 Hz, an output voltage is: 12-36V, an output current is: 1 A-6 A, an applicable temperature is: −10-55° C., an adjustable frequency range is: 0-120 kHz, and an effective distance is 50-1000 m;

the number of coil turns of the pipe coil is 20-60 turns, a material of the magnetized pipe 7 is: PVC pipe, and the pipe coil is wound on the magnetized pipe 7 in a flat winding approach; and a pipe diameter of the PVC pipe is: 63 mm-90 mm.

On the basis of the above technical solution, the magnetization generating apparatus includes: a microcontroller, a reset circuit, a display circuit, a Hall high-speed current detection sensor, a PWM pulse generating circuit, a pulse power amplifier circuit, a voltage regulator circuit and a DC power supply module;

the microcontroller is connected to the reset circuit, the display circuit, the Hall high-speed current detection sensor, the PWM pulse generating circuit, and the voltage regulator circuit;

the pulse power amplifier circuit is connected to the PWM pulse generating circuit, the DC power supply module and the pipe coil;

the voltage regulator circuit is connected to the DC power supply module;

the Hall high-speed current detection sensor is installed on the pipe coil;

the PWM pulse generating circuit generates a PWM pulse signal;

the pulse power amplifier circuit amplifies a power of the PWM pulse signal generated by the PWM pulse generating circuit again, and the amplified pulse signal acts on the magnetized pipe 7 through the external pipe coil;

the display circuit is capable of displaying a frequency and a current waveform output by the magnetizer 9;

the DC power supply module provides energy for the pulse power amplifier circuit and the microcontroller to ensure safe operation of the devices; and the voltage regulator circuit plays a role in stabilizing the voltage.

On the basis of the above technical solution, the magnetization generating apparatus further includes: a casing, a button, a first pulse coil line interface 27, a second pulse coil line interface 28, a switch key 35 and a power line interface 36;

the button, the first pulse coil line interface 27, the second pulse coil line interface 28, the switch key 35 and the power line interface 36 are installed on the casing;

the power line interface 36 connects the switch key 35 with an external power supply;

one end of the pipe coil is connected to the pulse power amplifier circuit through the first pulse coil line interface 27, and the other end of the pipe coil is connected to the pulse power amplifier circuit through the second pulse coil line interface 28;

the DC power supply module is connected to the switch key 35;

the display circuit is a display screen 31;

the display screen 31 is capable of realizing touch screen setting;

the button is connected to the microcontroller;

the microcontroller uses a single-chip microcomputer as a core, processes information through a software program set in a memory, adjusts parameters with the display circuit and the button, performs high-speed arithmetic processing on the received signal, and outputs a signal processing result to the PWM pulse generating circuit;

the Hall high-speed current detection sensor transmits a current waveform signal back to the single-chip microcomputer of the microcontroller for processing, and displays the signal on the display screen 31 at the same time;

the button includes: an upward adjustment key 29, a downward adjustment key 30, a confirmation key 32, a backspace key 33, a mode change key 34, a start key and a stop key;

the upward adjustment key 29 is configured to: turn up an index; and the downward adjustment key 30 is configured to: turn down an index.

On the basis of the above technical solution, a model used by the single-chip microcomputer is stm32f103rct6, the core uses ARM 32-bit Cortex™-M3 CPU, and a maximum operating frequency is: 72 MHz; the memory uses a 256K-512K bytes flash program memory, an SRAM up to 64K bytes, and a static memory controller with 4 chip selections; uses a 4-16 MHz crystal oscillator; uses 3 12-bit analog-to-digital converters, 1 μs conversion time (up to 21 input channels), and a conversion range is 0-3.6V; uses 4 16-bit timers, and each timer has 4 channels for input capture/output compare/PWM or pulse count and an incremental encoder for input; uses 5 USART interfaces (support ISO7816, LIN, IrDA interface and modem control); uses 3 SPI interfaces (18 M bit/s), CAN interface (2.0B active); and USB 2.0 full-speed interface.

On the basis of the above technical solution, the display screen 31 uses liquid crystal display and touch screen input, reflecting human-computer interaction. It uses a 5-inch touch screen liquid crystal display with a resolution of 800*480; the brightness is 900 nit, an output frequency of a required pulse may be set arbitrarily, a set pulse waveform may be displayed, and a real-time waveform and a peak current of the coil current may be displayed.

On the basis of the above technical solution, the Hall high-speed current detection sensor uses an ACS578 current sensor. The ACS758 current sensor converts a pulsating current signal into a voltage signal, amplifies the voltage signal through AD623, and connects with an A/D conversion interface of the single-chip microcomputer after outputting the signal.

On the basis of the above technical solution, the DC power supply module uses a switching power supply module, its output voltage is 24V, the current may reach up to 15 A, a conversion efficiency is over 87%, and a ripple is less than 50 mV; a cooling method of the module is: when operating at a low current, relying on a built-in heat sink for natural cooling, and when operating at a high current, the temperature rises and air cooling is turned on.

On the basis of the above technical solution, the voltage regulator circuit is: a DC/DC voltage regulator circuit; and
the DC/DC voltage regulator circuit converts a 24V DC power supply into a low-voltage DC power supply used by a single-chip microcomputer circuit, and uses XL1509 as a conversion chip in the DC/DC voltage regulator circuit. A wide power supply voltage input range of the XL1509 chip is: 4.5-40V; a low voltage drop is: 1.5V; a switching frequency is: 150 kHz; a high current load output is: 2 A; and a high conversion efficiency is: 87%.

On the basis of the above technical solution, the speed regulating apparatus 18 includes: a second copper valve 19, a third valve 20, a fourth valve 21, a flow meter 22 and a fifth valve 23; and the other ends of the several capillary pipes 39 are connected to one end of the second copper valve 19; the other end of the second copper valve 19 is connected to one end of the third valve 20 and one end of the fourth valve 21; the other end of the third valve 20 is connected to one end of the fifth valve 23, the other end of the fourth valve 21 is connected to one end of the flow meter 22, and the other end of the flow meter 22 is connected to the other end of the fifth valve 23.

A control method of the magnetization control apparatus for preventing clogging of a drip irrigation system irrigator, including steps as follows:

step one, pumping irrigation water from the water source project 1 through the first water pump 2, first passing through the drip irrigation head control hub 3, and then entering the pool 4;

step two: pumping the irrigation water through the second water pump 5 again, first flowing through the first copper valve 6, and then entering the magnetized pipe 7;

in the magnetization control apparatus, by observing a flow rate displayed by the flow rate monitor 10, adjusting the first valve 11 so that the flow rate displayed by the flow rate monitor 10 is: 1.2-1.6 m/s;

step three: the irrigation water after treated by the DC pulse variable frequency magnetizer returning to the pool 4 through the flow rate monitor 10 and the first valve 11 in turn;

monitoring a colony count, an electrical conductivity, dissolved oxygen and a surface tension of the irrigation water by the sensor 12 in the pool 4;

the irrigation water being subjected to cyclic magnetization treatment by the magnetization control apparatus, and the sensor 12 feeding back monitored data to the automatic control apparatus 13, when water quality of the irrigation water meets water quality requirements entering the capillary pipes 39, the automatic control apparatus 13 turning off the second water pump 5 and stopping the cyclic magnetization treatment;

where the water quality requirements of the irrigation water after the cyclic magnetization treatment are: the colony count should be less than $2 \times 10^3$ cfu/ml, the electrical conductivity is less than 4 ds/m, the dissolved oxygen is more than 5.0 mg/L, and a range of the surface tension is: 25-50 mN/m;

step four: the automatic control apparatus 13 controlling the third water pump 14 to turn on;

pumping the irrigation water after the cyclic magnetization treatment from the pool 4 through the third water pump 14, and further filtering through the mesh filter 15;

the irrigation water entering the branch pipe 38 and the capillary pipes 39 through the second valve 16 again; and the irrigation water flowing from the irrigators 17 for irrigation.

On the basis of the above technical solution, in the water quality requirements of the irrigation water mainly based on sterilization and supplemented by inhibition of salt ion crystallization, the colony count is used as a main evaluation index; and in the water quality requirements of the irrigation water mainly based on inhibition of salt ion crystallization and supplemented by sterilization, the electrical conductivity is used as the main evaluation index.

On the basis of the above technical solution, an operating pressure of the drip irrigation system is 0.07-0.12 Mpa; an irrigation frequency of the drip irrigation system is 3-10 d/time;

during operation of the drip irrigation system, flushing is performed every 50-60 hours;

steps for flushing are as follows:

S1. opening the second copper valve 19, the fourth valve 21 and the fifth valve 23, and closing the third valve 20;

S2. observing a flow rate in the pipe through the flow meter 22, and adjusting the second copper valve 19 so that a target flow rate displayed by the flow meter 22 is: 0.50-0.80 m/s;

S3, closing the fourth valve 21 and the fifth valve 23, opening the third valve 20, and flushing the capillary pipes 39 of the drip irrigation system for 5-10 minutes using the target flow rate; and S4. closing the second copper valve 19, increasing the operating pressure of the drip irrigation system to 0.15-0.20 MPa, and flushing the irrigators 17 of the drip irrigation system for 2-3 minutes.

On the basis of the above technical solution, a magnetic induction intensity of the DC pulse variable frequency magnetizer is: 500-800 mT, a sweep frequency range is: 20 Hz-60 kHz, a scanning period is: 1.2-1.5 s, and a carrier frequency is: 1.0-1.2 MHz;

a material of the pipe coil is: copper wire, and a cross-sectional area is: 0.5-1 mm$^2$; and the mesh filter 15 is a 150-mesh filter.

On the basis of the above technical solution, an anti-clogging ability evaluation parameter ACA of the irrigators 17 is not less than 0.8, and the flow rate is 0.5-3.0 L·h$^{-1}$;

the irrigators 17 are: chip irrigators;

the ACA is calculated according to formula (1), $$ACA = -13.16 \times A^{1/2}/L - 0.33 \times W/D + 1.57 \tag{1}$$

where, A is a cross-sectional area of a flow channel of the irrigator, L is a length of the flow channel of the irrigator, W is a width of the flow channel of the irrigator, and D is a depth of the flow channel of the irrigator.

Beneficial technical effects of the present disclosure are as follows:

1. The magnetization control apparatus for preventing clogging of a drip irrigation system irrigator described in the present disclosure may effectively solve the clogging problem of the drip irrigation system irrigator, and the magnetization control method may prevent environmental pollution caused by the application of traditional acid addition and chlorine addition technology; has the advantages of cleanliness and high-efficiency;

2. The irrigation water after the cyclic magnetization treatment may improve crop yield and quality, avoid the problem of crop yield reduction caused by the application of traditional acid addition and chlorine addition methods; and may improve use enthusiasm of users;

3. Compared with the traditional acid addition and chlorine addition methods, the operation mode of the magnetization control apparatus for preventing clogging of a drip irrigation system irrigator described in the present disclosure is simple, and is convenient for users to operate.

BRIEF DESCRIPTION OF THE DRAWINGS

The present disclosure has the following accompanying drawings.

REFERENCE NUMERALS

Figure 1:
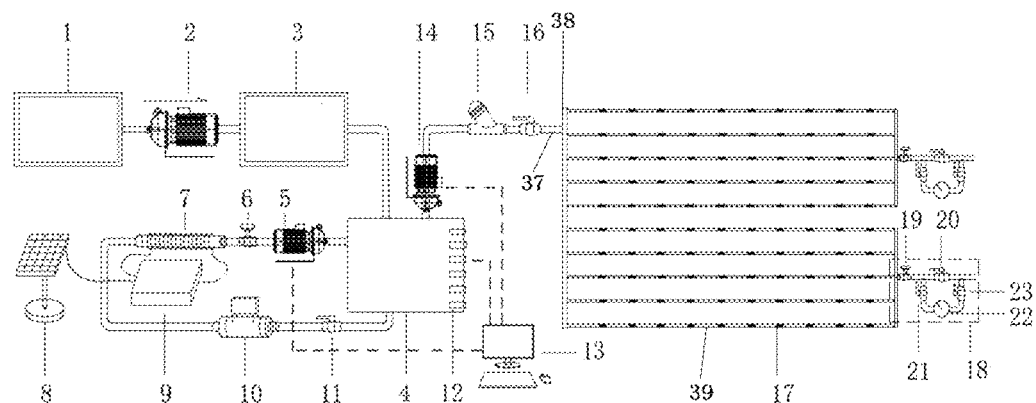
FIG. 1 is a schematic diagram of an overall arrangement of a drip irrigation system according to the present disclosure.

1. Water source project; 2. First water pump; 3. Drip irrigation head control hub; 4. Pool; 5. Second water pump; 6. First copper valve; 7. Magnetized pipe; 8. Solar panel; 9. Magnetizer; 10. Flow rate monitor; 11. First valve; 12. Sensor; 13. Automatic control apparatus; 14. Third water pump; 15. Mesh filter; 16. Second valve; 17. Irrigator; 18. Speed regulating apparatus; 19. Second copper valve; 20. Third valve; 21. Fourth valve; 22. Flow meter; 23. Fifth valve; 24. Copper wound coil; 26. Magnetizer parameter identification area; 27. First pulse coil line interface; 28. Second pulse coil line interface; 29. Upward adjustment key; 30. Downward adjustment key; 31. Display screen; 32. Confirmation key; 33. Backspace key; 34. Mode change key; 35. Switch key; 36. Power line interface.

DETAILED DESCRIPTION OF EMBODIMENTS

In order to make the objectives, technical solution and advantages of the present disclosure clearer, the technical solution in embodiments of the present disclosure will be described in more detail below with reference to the accompanying drawings in the embodiments of the present disclosure. Throughout the accompanying drawings, the same or similar reference numerals refer to the same or similar elements or elements having the same or similar functions. The described embodiments are some, but not all, of the embodiments of the present disclosure. The embodiments and directional words described below with reference to the accompanying drawings are all exemplary, and are intended to be used to explain the present disclosure, but should not be construed as limiting the present disclosure. Based on the embodiments of the present disclosure, all other embodiments obtained by those of ordinary skill in the art without creative efforts shall fall within the protection scope of the present disclosure. The embodiments of the present disclosure will be described in detail below with reference to the accompanying drawings.

In a broad embodiment of the present disclosure, in a magnetization control apparatus for preventing clogging of a drip irrigation system irrigator, the magnetization control apparatus is configured to: prevent clogging of the drip irrigation system irrigator and improve crop yield and quality; and the drip irrigation system includes: a water source project 1, a water transmission and distribution pipe network, several irrigators 17, a first water pump 2, a drip irrigation head control hub 3 and the magnetization control apparatus.

The magnetization control apparatus is arranged between main pipes 37 of the drip irrigation system. As shown in FIG. 1, the magnetization control apparatus includes: a pool 4, a second water pump 5, a first copper valve 6, a magnetized pipe 7, a solar panel 8, a magnetizer 9, a flow rate monitor 10, a first valve 11, a sensor 12 and an automatic control apparatus 13.

The pool 4 and the magnetized pipe 7 are connected through the second water pump 5, and the first copper valve 6 is set in the middle of the magnetized pipe 7 and the second water pump 5 to adjust flow rate changes. The first copper valve 6 and the flow rate monitor 10 are connected through the magnetized pipe 7 and the main pipe 37, the magnetized pipe 7 is wound with a pipe coil of the magnetizer 9, and the flow rate monitor 10 is connected to the pool 4 through the first valve 11. The sensor 12 is located in the pool 4, and the automatic control apparatus 13 is connected to the sensor 12 and the second water pump 5. The solar panel 8 is connected to the magnetizer 9.

The water transmission and distribution pipe network includes: a third water pump 14, a mesh filter 15, a second valve 16, a speed regulating apparatus 18 and several main pipes 37, a branch pipe 38 and several capillary pipes 39. The automatic control apparatus 13 is connected to the third water pump 14. The irrigators 17 are located on the capillary pipes 39, and the speed regulating apparatus 18 is located at a tail of the capillary pipe 39. The speed regulating apparatus 18 includes: a second copper valve 19, a third valve 20, a fourth valve 21, a flow meter 22 and a fifth valve 23.

The drip irrigation head control hub 3 includes: a water pump, a power machine, a control device, a filtering apparatus, a fertilization apparatus, and a measurement and protection device, etc.

The control method of the magnetization control apparatus for preventing clogging of a drip irrigation system irrigator is as follows: as shown in FIG. 1, irrigation water is pumped from the water source project 1 through the first water pump 2, first passes through the drip irrigation head control hub 3, and then enters the pool 4. The irrigation water is pumped through the second water pump 5 again, first flows through the first copper valve 6, and then enters the magnetized pipe 7. In the magnetization control apparatus, by observing a flow rate displayed by the flow rate monitor 10, the first valve 11 is adjusted so that the flow rate displayed by the flow rate monitor 10 is: 1.2-1.6 m/s. A magnetic induction intensity of the magnetizer 9 is: 500-800 mT, a sweep frequency range is: 20 Hz-60 kHz, a scanning period is: 1.2-1.5 s, and a carrier frequency is: 1.0-1.2 MHz. A material of the pipe coil is: copper wire, a cross-sectional area is: 0.5-1 mm$^2$, the number of coil turns of the pipe coil is 20-60 turns, and the pipe coil is wound on the magnetized pipe 7 in a flat winding approach. The irrigation water treated by the magnetizer 9 returns to the pool 4 through the first valve 11, and monitors a colony count, an electrical conductivity, dissolved oxygen and a surface tension of the irrigation water by the sensor 12 in the pool 4. After cyclic magnetization treatment by the magnetization control apparatus, the colony count of water quality after the magnetization treatment should be less than $2\times10^3$ cfu/ml, the electrical conductivity is less than 4 ds/m, the dissolved oxygen is greater than 5.0 mg/L, and a range of the surface tension is: 25-50 mN/m. The irrigation water meeting the above water quality requirements enters the capillary pipes 39 of the drip irrigation system. After data monitored by the sensor 12 is fed back to the automatic control apparatus 13, when the water quality of the irrigation water meets the water quality requirements entering the capillary pipes 39, the automatic control apparatus 13 turns off the second water pump 5 and stops the cyclic magnetization treatment. The irrigation water after the cyclic magnetization treatment is pumped from the pool 4 through the third water pump 14, and is further filtered through the 150-mesh filter 15, enters the branch pipe 38 and the capillary pipes 39 through the second valve 16 again, and the irrigation water flows from the irrigators 17 for irrigation.

Irrigators with an ACA greater than 0.8 and a flow rate of 0.5-3.0 L·h$^{-1}$ are selected as the irrigators 17. An operating pressure of the drip irrigation system is: 0.07-0.12 MPa, during operation of the drip irrigation system, flushing is performed every 50 hours. During flushing, opening the second copper valve 19, the fourth valve 21 and the fifth valve 22, and closing the third valve 20; observing a flow rate in the pipe through the flow meter 22, and adjusting the second copper valve 19 so that a target flow rate displayed by the flow meter 22 is: 0.50-0.80 m/s; then, closing the fourth valve 21 and the fifth valve 23, opening the third valve 20, and flushing the capillary pipes 39 of the drip irrigation system for 5-10 minutes using the target flow rate; and finally closing the second copper valve 19, increasing the operating pressure of the drip irrigation system to 0.15-0.20 MPa, and flushing the irrigators 17 of the drip irrigation system for 2-3 minutes.

The magnetizer 9 of the present disclosure uses a DC pulse variable frequency magnetizer, having a structure suitable for the drip irrigation system, including two parts: a magnetization generating apparatus and a pipe coil. Comprehensively considering scale inhibition to the drip irrigation system irrigator and influence on crop growth, an internal circuit, software and the pipe coil of the DC pulse variable frequency magnetizer are improved. The number of coil turns of the pipe coil is 20-60 turns, a material of the magnetized pipe 7 is: PVC pipe, and the pipe coil is wound on the magnetized pipe 7 in a flat winding approach.

Figure 2:
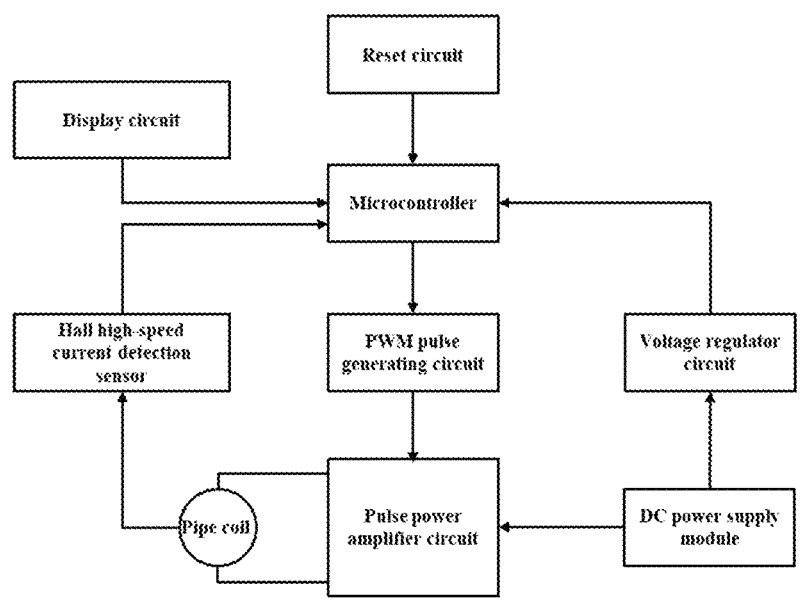
FIG. 2 is a schematic block diagram of an internal circuit connection of a DC pulse variable frequency magnetizer according to the present disclosure.
Figure 6:
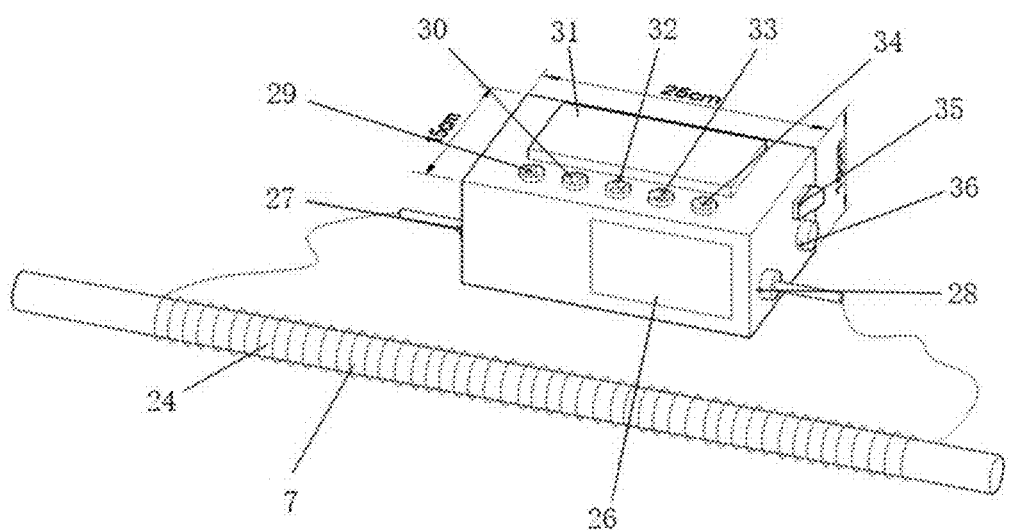
FIG. 6 is a schematic diagram of a three-dimensional structure of a DC pulse variable frequency magnetizer according to the present disclosure.

As shown in FIG. 2 and FIG. 6, a hardware part of the DC pulse variable frequency magnetizer includes: a microcontroller, a signal generating circuit (i.e., a PWM pulse generating circuit in FIG. 2), a pulse power amplifier circuit, a DC power supply module, a voltage regulator circuit, a Hall high-speed current detection sensor, a display circuit, a reset circuit and a button, and the like. The microcontroller uses a single-chip microcomputer as a core, processes information through a software program set in a memory, adjusts parameters with the display circuit and the button, performs high-speed arithmetic processing on the received signal, outputs a signal processing result to the PWM pulse generating circuit to generate a PWM pulse signal. The pulse power amplifier circuit amplifies a power of the PWM pulse signal generated by the PWM pulse generating circuit again, and the amplified pulse signal acts on the magnetized pipe 7 through the external pipe coil.

The Hall high-speed current detection sensor is installed on the pipe coil, which can transmit a current waveform signal back to the single-chip microcomputer of the microcontroller for processing, and displays the signal on the display circuit at the same time. The display circuit is directly connected to the microcontroller and is capable of displaying a frequency and a current waveform output by the magnetizer 9. The DC power supply module provides energy for the pulse power amplifier circuit and the microcontroller to ensure safe operation of the devices. The voltage regulator circuit is connected between the microcontroller and the DC power supply, and plays a role in stabilizing the voltage. The reset circuit is directly connected to the microcontroller. The display circuit is a display screen 31; and the button includes a start key and a stop key, and the like.

Figure 3:
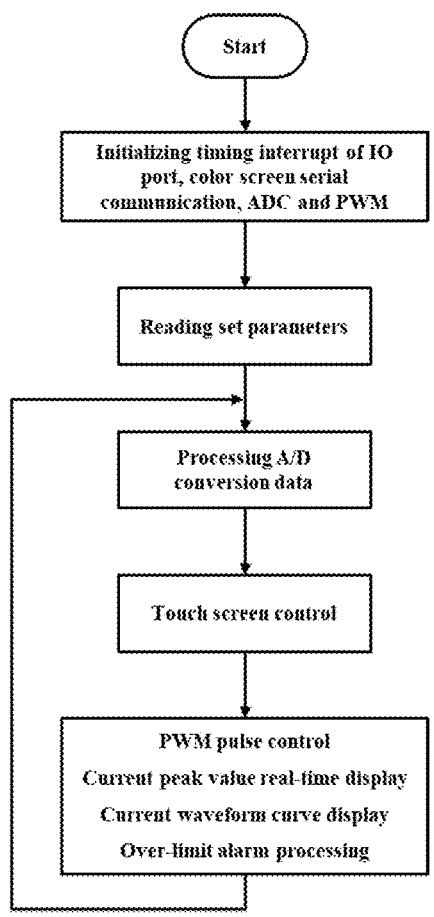
FIG. 3 is a schematic flowchart of a main program of a magnetizer according to the present disclosure.
Figure 4:
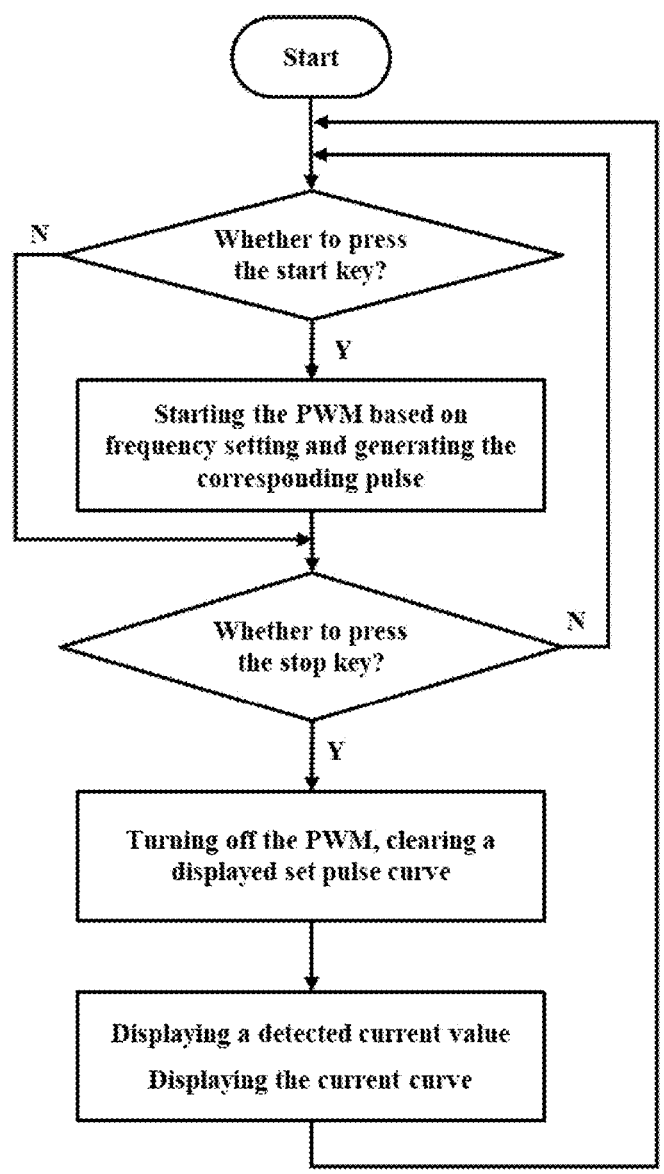
FIG. 4 is a schematic flowchart of electromagnetic pulse generation and measurement display according to the present disclosure.
Figure 5:
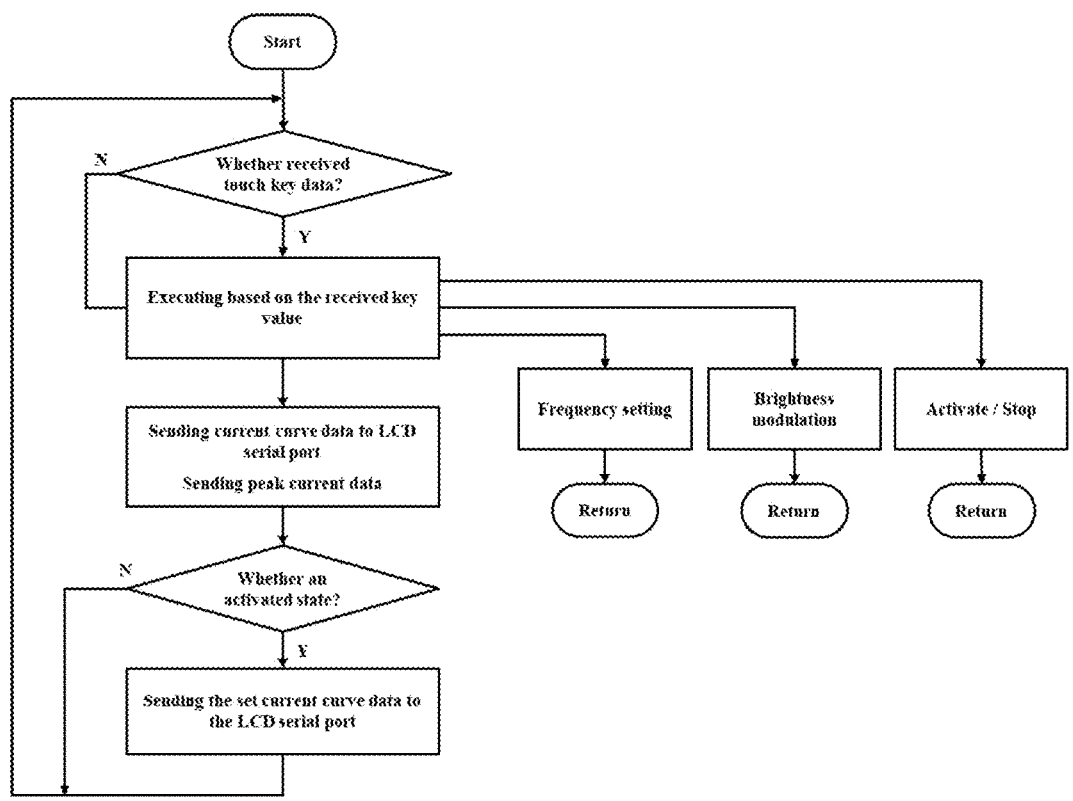
FIG. 5 is a schematic flowchart of liquid crystal display and touch screen control according to the present disclosure.

The present disclosure develops a dedicated software for the DC pulse variable frequency magnetizer, including: a main program of the magnetizer, an electromagnetic pulse generating circuit and a measurement display program, a liquid crystal display and touch screen control program. FIG. 3 is a schematic flowchart of a main program of a magnetizer according to the present disclosure. FIG. 4 is a schematic flowchart of electromagnetic pulse generation and measurement display according to the present disclosure. FIG. 5 is a schematic flowchart of liquid crystal display and touch screen control according to the present disclosure.

As shown in FIG. 3, flow steps of the main program of the magnetizer are briefly described as follows:

S11, starting the DC power supply module to work;
S12, initializing timing interrupt of TO port, color screen serial communication, analog-to-digital conversion (ADC) and pulse width modulation (PWM);
S13, reading set parameters; and
S14, if the reading of the set parameters is successful, converting an analog signal into a digital signal via an A/D converter and displaying, and realizing touch screen setting at the same time; displaying a peak value and a waveform curve of the current on a screen of the display screen 31 in real time, and performing over-limit alarm processing; and may also adjusting the pulse signal on the screen of the display screen 31.

As shown in FIG. 4, flow steps of the electromagnetic pulse generation and measurement display are briefly described as follows:

S21, starting the DC power supply module to work;
S22, pressing the start key;
S23, the magnetizer 9 starting the corresponding PWM pulse signal based on parameters such as the set sweep frequency and the scanning period; and
S24, after the operation of the magnetizer 9, pressing the stop key, the PWM pulse signal is no longer generated and a pulse curve on the display screen 31 is cleared, displaying a detected current value, and displaying the current curve.

As shown in FIG. 5, flow steps of the liquid crystal display and touch screen control are briefly described as follows:

S31, starting the DC power supply module to work;
S32, displaying the last parameters on the display screen 31, including: sweep frequency, display brightness, and PWM pulse signal start or stop, etc., and the parameters may also be adjusted; and
S33, after receiving modified data of a touch key on the display screen 31, executing based on the adjusted parameters, and sending current curve data and peak current data to an LCD serial port of the display screen 31 based on the set parameters, if the PWM pulse signal is activated, then re-updating the current curve, if the PWM pulse signal is not activated, waiting for a user button command.

As shown in FIG. 6, is the DC pulse variable frequency magnetizer of the present disclosure, and the DC pulse variable frequency magnetizer further includes: a casing, a first pulse coil line interface 27, a second pulse coil line interface 28, a switch key 35 and a power line interface 36; the button further includes: an upward adjustment key 29, a downward adjustment key 30, a confirmation key 32, a backspace key 33, a mode change key 34, and the like; and a magnetizer parameter identification area 26 is provided on the front of the casing. The mode change key 34 first sets fixed parameters (mainly the sweep frequency, a current intensity and the scanning period, etc.), and then the DC pulse variable frequency magnetizer operates according to the above set parameter mode; several parameter modes may be set at the same time for easy switching.

The pipe coil uses a copper wound coil 24, which is evenly and compactly wound on the PVC pipe. In order to ensure the practicability and easy replacement during irrigation, the magnetized pipe 7 uses a PVC pipe commonly used in irrigation, with a pipe diameter of 63 mm-90 mm.

Main technical parameters of the DC pulse variable frequency magnetizer are as follows: an input voltage is: 220V/50 Hz, an output voltage is: 12-36V, an output current is: 1 A-6 A, an applicable temperature is: −10-55° C., an adjustable frequency range is: 0-120 kHz, and an effective distance is 50-1000 m.

A water quality treatment effect evaluation system is as follows:

With the extension of cycling time, the treatment effect of the DC pulse variable frequency magnetizer on water quality gets better. Comprehensively considering the influence on clogging of the irrigator and crop growth, an evaluation system that can quickly predict the treatment effect of the magnetizer 9 on water quality may be established. Therefore, the treatment effect of the DC pulse variable frequency magnetizer of the present disclosure on water quality may be evaluated using the following evaluation system: when the irrigation water is cycled through the DC pulse variable frequency magnetizer, the sensor 12 monitors the colony count, the electrical conductivity, a sterilization rate, the surface tension, the dissolved oxygen and redox potential of the irrigation water. When the above indexes all reach set thresholds, the sensor 12 feeds back to the automatic control apparatus 13, and turns off the second water pump 5 to stop the cyclic magnetization treatment. In this regard, drip irrigation may be performed after pumping water through the third water pump 14.

In the water quality requirements of the irrigation water mainly based on sterilization and supplemented by inhibition of salt ion crystallization (for example, drip irrigation water sources such as reclaimed water), the colony count is used as a main evaluation index, the colony count of the water quality after the cyclic magnetization treatment should be less than $2 \times 10^3$ cfu/ml.

In the water quality requirements of the irrigation water mainly based on inhibition of salt ion crystallization and supplemented by sterilization (for example, drip irrigation water sources such as brackish water), the electrical conductivity is used as the main evaluation index. The electrical conductivity of the water quality after the cyclic magnetization treatment should be less than 4.0 ds/m.

The influence of the irrigation water on crop growth uses the dissolved oxygen and the surface tension as evaluation indexes. The higher the dissolved oxygen, the lower the surface tension, representing the better the treatment effect of the magnetizer 9; the dissolved oxygen in the irrigation water after the magnetization treatment should be greater than 5.0 mg/L, and the range of the surface tension is: 25-50 mN/m.

An operation mode of the DC pulse variable frequency magnetizer of the present disclosure is as follows: the sweep frequency range is: 20 Hz-60 kHz, the scanning period is: 1.2-1.5 s, and the carrier frequency is: 1.0-1.2 MHz. The material of the pipe coil is: copper wire, the cross-sectional area is: 0.5-1 mm$^2$, the number of coil turns of the pipe coil is 20-60 turns, and the pipe coil is wound on the magnetized pipe 7 in a flat winding approach. The flow rate of the water passing through the magnetizer 9 is 1.2-1.6 m/s, and the magnetic induction intensity is 500-800 mT.

An operating pressure of a drip irrigation system inlet is generally set to: 0.07-0.12 MPa, and an irrigation frequency of the drip irrigation system is 3-10 d/time. Since the cyclic magnetization treatment can significantly affect adhesion between fouling and inner walls of the capillary pipes 39 and the irrigators 17, making original dense fouling become loose fouling, by controlling the flow rate inside the capillary pipes 39 and flow channels of the irrigators 17, a flow shear force on wall surfaces may be enhanced to prevent deposition of fouling on the inner walls of the capillary pipes 39 and the inner walls of the irrigators 17, thereby controlling the clogging. A suitable flushing frequency of the drip irrigation system is 50-60 h/time; a capillary flushing flow rate should be controlled at 0.5-0.8 m/s, and flushing time should be 5-10 min; and a flushing operating pressure of the irrigators should be controlled at 0.15-0.20 MPa. The irrigators 17 may be chip irrigators with a flow rate of 0.5-3.0 L/h, and irrigators with a large anti-clogging ability evaluation parameter ACA may be selected. The larger the value is, the stronger the anti-clogging ability of the irrigators 17 is. It is recommended that the value is not less than 0.8, and a calculation formula is as shown in formula (1):

$$ACA = -13.16 \times A^{1/2}/L - 0.33 \times W/D + 1.57 \quad (1)$$

in the formula, A is a cross-sectional area of the flow channel of the irrigator, L is a length of the flow channel of the irrigator, W is a width of the flow channel of the irrigator, and D is a depth of the flow channel of the irrigator.

The present disclosure may be widely applied to the clogging control of drip irrigation systems of complex water sources. An implementation process of the magnetization control apparatus is described below by taking the clogging control of drip irrigation system irrigator of an inferior water source as an example.

(1) Design and Manufacture of DC Pulse Variable Frequency Magnetizer

The DC pulse variable frequency magnetizer includes two parts: a magnetization generating apparatus and a pipe coil. The present disclosure comprehensively considers scale inhibition to the drip irrigation system irrigator and influence on crop growth, and designs the internal circuit, software and pipe coil (the number of coil turns, the pipe material and a coil shape) of the DC pulse variable frequency magnetizer.

As shown in FIG. 2, the hardware part of the DC pulse variable frequency magnetizer is mainly divided into: the microcontroller, the signal generating circuit (i.e., the PWM pulse generating circuit in FIG. 2), the pulse power amplifier circuit, the DC power supply module, the voltage regulator circuit, the display circuit, the reset circuit and the Hall high-speed current detection sensor, and the like.

The composition and structure of the parts are as follows: the microcontroller uses the single-chip microcomputer as the core, and processes information through the software program set in the memory. A model used by the single-chip microcomputer is stm32f103rct6, the core uses ARM 32-bit Cortex™-M3 CPU, and a maximum operating frequency is: 72 MHz; the memory uses a 256K-512K bytes flash program memory, an SRAM up to 64K bytes, and a static memory controller with 4 chip selections; uses a 4-16 MHz crystal oscillator; uses 3 12-bit analog-to-digital converters, 1 µs conversion time (up to 21 input channels), and a conversion range is 0-3.6V; uses 4 16-bit timers, and each timer has 4 channels for input capture/output compare/PWM or pulse count and an incremental encoder for input; uses 5 USART interfaces (support ISO7816, LIN, IrDA interface and modem control); uses 3 SPI interfaces (18 M bit/s), CAN interface (2.0B active); and USB 2.0 full-speed interface.

The microcontroller cooperates with the display circuit and a data input module (that is, the button and touch screen input of the display screen 31), adjusts the parameters through the button, performs high-speed arithmetic processing on the received signal, and outputs the signal processing result to the PWM pulse generating circuit to generate the PWM pulses signal. The display circuit uses liquid crystal display and touch screen input, reflecting human-computer interaction. It uses a 5-inch touch screen liquid crystal display with a resolution of 800*480; the brightness is 900 nit, an output frequency of a required pulse may be set arbitrarily, a set pulse waveform may be displayed, and a real-time waveform and a peak current of the coil current may be displayed.

The pulse power amplifier circuit amplifies the power of the PWM pulse signal, and the amplified pulse signal acts on the magnetized pipe 7 through the pipe coil. The Hall high-speed current detection sensor is installed on the pipe coil, which can transmit the current waveform signal to the microcontroller for processing, and display the signal on the display circuit at the same time. The Hall high-speed current detection sensor uses an ACS578 current sensor. The ACS758 current sensor is a linear current sensor based on the Hall effect. The ACS758 current sensor provides an economical and accurate solution for AC or DC current sensing. Accurate and proportional output voltage is provided by a chopper-stable, low-bias BiCMOS Hall IC. The ACS758's unique integrated screen technology provides high immunity to current conductor dV/dt signals and stray electric fields, ensuring low output voltage ripple and low bias drift in high-end and high-voltage applications. When passing through a main copper conduction path used as a current sensing path, an internal resistance of the conduction path is typically 100 µΩ, with low power loss. The ACS758 current sensor converts a pulsating current signal into a voltage signal, amplifies the voltage signal through AD623, and connects with an A/D conversion interface of the single-chip microcomputer after outputting the signal.

The DC power supply module is connected to the pulse power amplifier circuit and the voltage regulator circuit, and provides energy for the pulse power amplifier circuit and the microcontroller. It uses a high-efficiency switching power supply module, its output voltage is 24V, the current may reach up to 15 A, a conversion efficiency is over 87%, and a ripple is less than 50 mV. A cooling method of the module is: when operating at a low current, relying on a built-in heat sink for natural cooling, and when operating at a high current, the temperature rises and air cooling is turned on. When the DC power supply module outputs, the voltage regulator circuit is connected to stabilize the voltage, and then the microcontroller is connected. The voltage regulator circuit is: a DC/DC voltage regulator circuit. The DC/DC voltage regulator circuit converts a 24V DC power supply into a low-voltage DC power supply used by a single-chip microcomputer circuit. This design uses XL1509 as a conversion chip in the DC/DC voltage regulator circuit, and features of the chip are as follows: a wide power supply voltage input range is: 4.5-40V; a low voltage drop is: 1.5V; a switching frequency is: 150 kHz; a high current load output is: 2 A; and a high conversion efficiency is: 87%.

The reset circuit is directly connected to the microcontroller to restore the circuit to an initial state and recalculate. When the power supply is powered on, only when VCC exceeds 4.75V, lower than 5.25V and the crystal oscillator is operating stably, a reset signal may be removed, and the microcontroller starts to work normally.

(2) Control of Magnetized Water on Clogging of Irrigator

Test water sources uses two kinds of reclaimed water and two kinds of inferior water sources, including two kinds of reclaimed water and two kinds of biogas slurry. Two kinds of municipal reclaimed water are respectively treated by two treatment processes: sequencing batch aeration treatment (SBWL) and cyclic activated sludge system (CASS). The two kinds of biogas slurry were obtained from cattle and pig farms in Changping area of Beijing, and were defined as BSC and BSP respectively, diluted with local groundwater at a ratio of 1:8. The four water sources all contain two treatments, magnetization and non-magnetization. There are 8 treatments in total, namely SBWL_M (M stands for magnetization), SBWL, CASS_M, CASS, BSC_M, BSC, BSP_M, and BSP.

(3) Influence of Magnetized Water on Crop Growth

The present disclosure also conducts experimental research on the influence of the irrigation water after cyclic magnetization treatment on water quality and crop growth. From Sep. 20, 2019, a round of tomato cultivation experiment was carried out in a solar greenhouse of Tongzhou Experimental Base of China Agricultural University, Tongzhou District, Beijing. This experiment is mainly to explore the influence of irrigation water (abbreviated as: magnetized water) produced by different magnetization treatments on the growth effect of greenhouse tomato. The experiment explored six magnetization modes, namely non-magnetization (CK), permanent magnet 200 mT (PMF_200), permanent magnet 500 mT (PMF_500), permanent magnet 800 mT (PMF_800), AC variable frequency processing (ACEMF) and self-developed DC pulse processing (DCEMF).

The tomato variety tested is "Zhefen 702", which is an early-maturing and infinitely growing type, with vigorous plant growth and strong fruit setting ability. The fruit is tall and round. The young fruit is pale green, without green shoulders. The fruit surface is smooth, without grooves. At the second time of slow seedling water after tomato planting, 5 kg/mu of urea was applied, and a fruit-promoting fertilizer was combined with irrigation and topdressing when the first ear of fruit began to expand, and kg/mu of diammonium phosphate and 6 kg/mu of potassium nitrate were applied. Generally, during a period from whitening of the first ear to rapid expansion of the third ear, topdressing 2 to 3 times, topdressing diammonium phosphate 10 kg/mu, potassium nitrate 10 kg/mu, and ternary compound fertilizer (N\P\K) 20 kg/mu once each.

Figure 7:
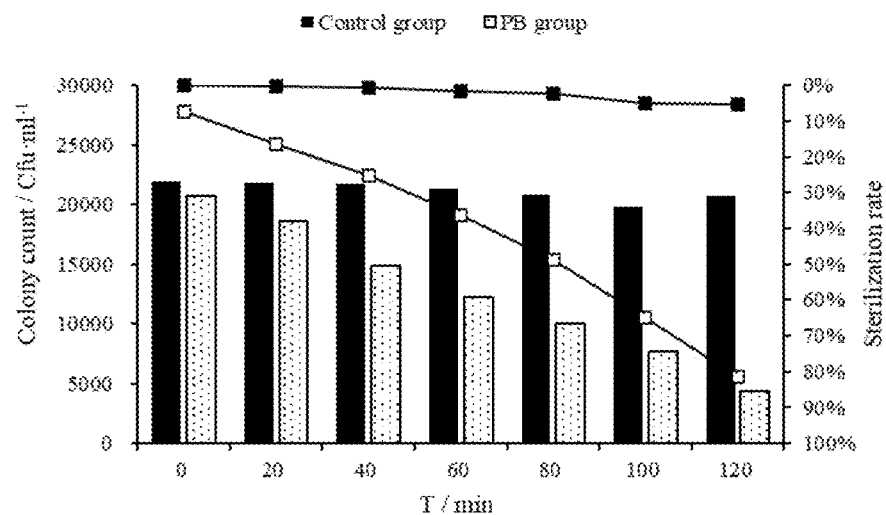
FIG. 7 is a schematic diagram of an influence curve of a magnetization control apparatus on sterilization of reclaimed water according to the present disclosure.
Figure 8:
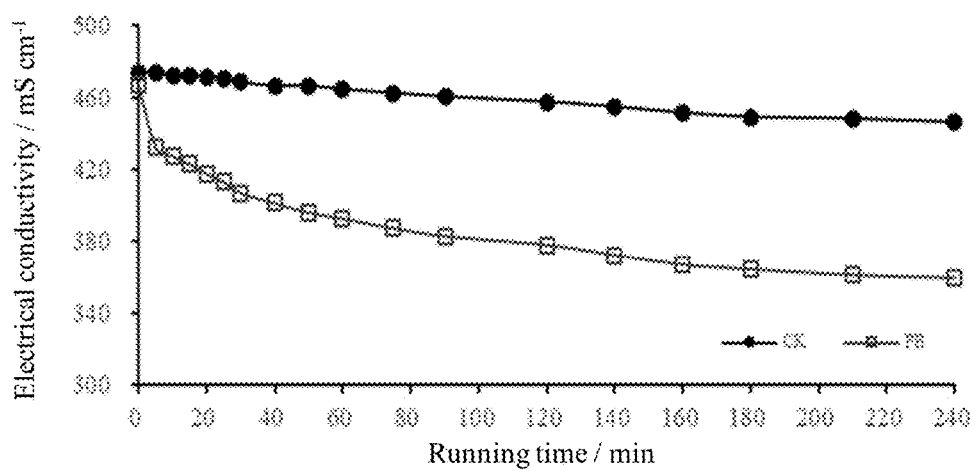
FIG. 8 is a schematic diagram of an influence curve of a magnetization control apparatus on electrical conductivity of reclaimed water according to the present disclosure.
Figure 9:
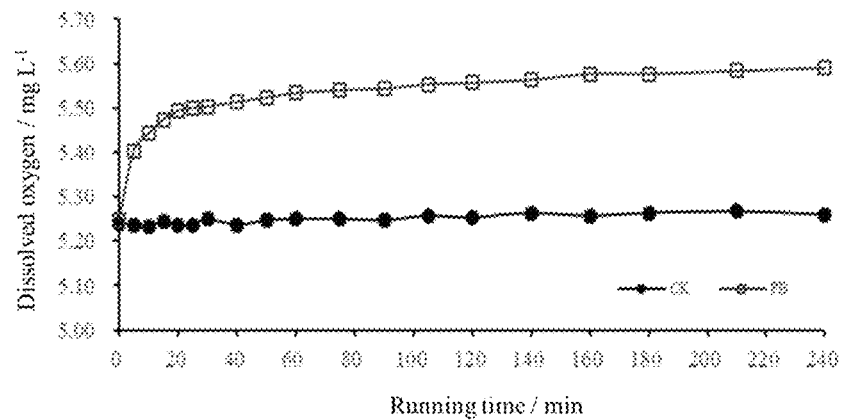
FIG. 9 is a schematic diagram of an influence curve of a magnetization control apparatus on dissolved oxygen of reclaimed water according to the present disclosure.

Test results showed that with the extension of drip irrigation system cycle running time T, the water quality has changed significantly, the total amount of microbial colonies has been continuously reduced, and the sterilization rate has shown a linear increasing trend. After 2 h of cycling, as shown in FIG. 7, the sterilization rate reached more than 80% (CK and PB are control and magnetization treatment, respectively). As shown in FIG. 8, the electrical conductivity EC decreased by 17.4%, and as shown in FIG. 9, the dissolved oxygen DO increased by 5.56%.

Figure 10:
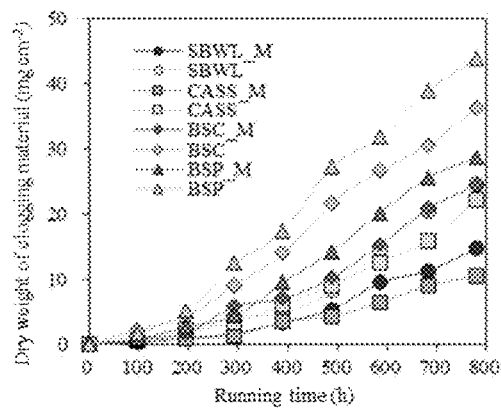
FIG. 10 is a schematic diagram of influence of magnetized water on dry weight of clogging material inside an irrigator according to the present disclosure.
Figure 11:
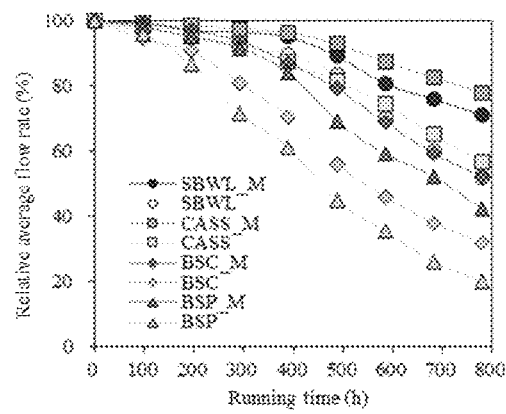
FIG. 11 is a schematic diagram of influence of magnetized water on a relative average flow rate inside an irrigator according to the present disclosure.
Figure 12:
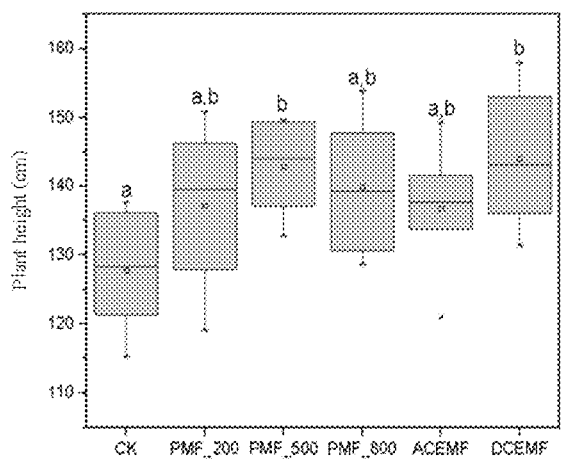
FIG. 12 is a schematic diagram of an influence curve of magnetized water on tomato plant height according to the present disclosure.
Figure 13:
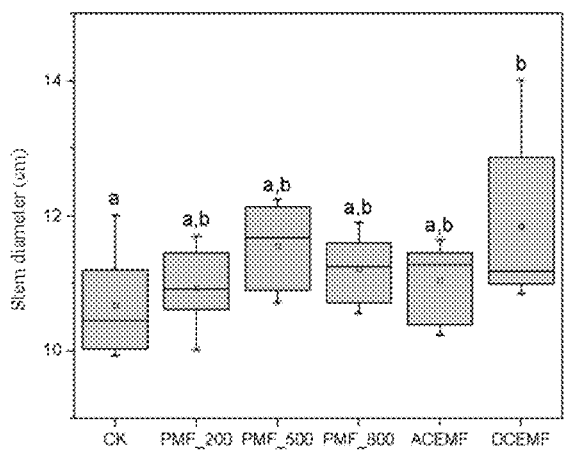
FIG. 13 is a schematic diagram of an influence curve of magnetized water on tomato stem diameter according to the present disclosure.
Figure 14:
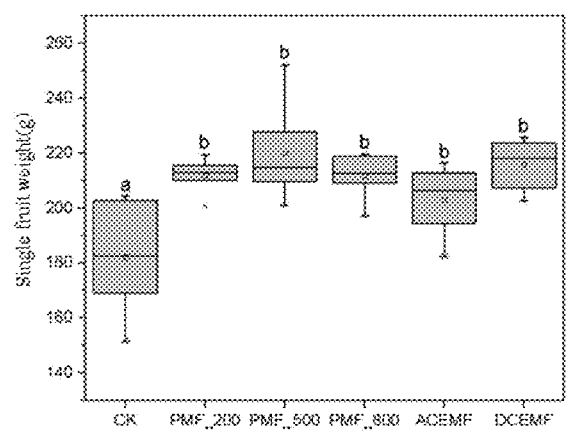
FIG. 14 is a schematic diagram of an influence curve of magnetized water on tomato single fruit weight according to the present disclosure.
Figure 15:
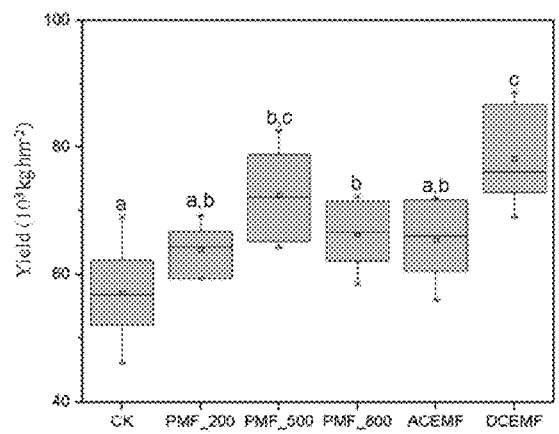
FIG. 15 is a schematic diagram of an influence curve of magnetized water on tomato yield according to the present disclosure.

As shown in FIGS. 10-11, when the drip irrigation system was running for 390 h and 780 h, the dry weight of clogging material inside the irrigator in the magnetization treatment was 30.8%-66.4% and 20.1%-58.4% lower than the control, respectively. A relative average flow rate was 5.9%-43.5% and 18.1%-157.9% higher than the control, respectively, which indicates that the magnetization treatment effectively relieves the clogging of the drip irrigation system.

As shown in FIGS. 12-15, the tomato plant height increased by 7.1%-12.7%, the stem diameter increased by 2.4%-11.0%, the single fruit weight increased by 11.5%-20.9%, and the yield increased by 11.8%-36.9% after irrigation with the magnetized water, which indicates that magnetized water irrigation promotes tomato growth and yield improvement. At the same time, it may be found that the tomato yield of magnetic intensity at 500 mT and 800 mT was significantly higher than that at 200 mT, and the self-developed DC pulse variable frequency magnetizer achieves the best effect.

Finally, it should be noted that the above embodiments are only used to illustrate the technical solution of the present disclosure, rather than limiting. Although the present disclosure has been described in detail with reference to the foregoing embodiments, those of ordinary skill in the art should understand that: it is still possible to modify the technical solution described in the foregoing embodiments, or perform equivalent substitutions to some of the technical features; and these modifications or substitutions do not make the essence of the corresponding technical solution deviate from the spirit and scope of the technical solution of the embodiments of the present disclosure.

Contents not described in detail in the present specification belong to the prior art known to those skilled in the art.

What is claimed is:

1. A drip irrigation system, having a magnetization control apparatus for preventing clogging of a drip irrigation system irrigator, the drip irrigation system comprising:
   a water source project (1), a water transmission and distribution pipe network, at least one irrigator (17), a first water pump (2), a drip irrigation head control hub (3) and the magnetization control apparatus;
   wherein the magnetization control apparatus comprises: a pool (4), a second water pump (5), a first copper valve (6), a magnetized pipe (7), a magnetizer (9), a flow rate monitor (10), a first valve (11), a sensor (12) and an automatic control apparatus (13);
   wherein the water transmission and distribution pipe network comprises: a third water pump (14), a mesh filter (15), a second valve (16), a speed regulating apparatus (18), at least one main pipe (37), a branch pipe (38) and at least one capillary pipe (39);
   the water source project (1) is connected to one end of the first water pump (2) through the at least one main pipe (37), and the other end of the first water pump (2) is connected to an inlet of the drip irrigation head control hub (3) through the at least one main pipe (37); an outlet of the drip irrigation head control hub (3) is connected to an inlet of the pool (4) through the at least one main pipe (37);
   the pool (4) is connected to one end of the second water pump (5) through the at least one main pipe (37), and the other end of the second water pump (5) is connected to one end of the first copper valve (6) through the at least one main pipe (37); the other end of the first copper valve (6) is connected to one end of the magnetized pipe (7); the other end of the magnetized pipe (7) is connected to one end of the flow rate monitor (10) through the at least one main pipe (37), the other end of the flow rate monitor (10) is connected to one end of the first valve (11) through the at least one main pipe (37), and the other end of the first valve (11) is connected to the pool (4) through the at least one main pipe (37);
   the sensor (12) is located in the pool (4), and the automatic control apparatus (13) is connected to the sensor (12), the second water pump (5) and the third water pump (14);
   an outlet of the pool (4) is connected to one end of the third water pump (14) through the at least one main pipe (37), and the other end of the third water pump (14) is connected to one end of the mesh filter (15) through the at least one main pipe (37); the other end of the mesh filter (15) is connected to one end of the second valve (16) through the at least one main pipe (37), the other end of the second valve (16) is connected to the branch pipe (38), and the branch pipe (38) is connected to one of the ends of the at least one capillary pipe (39); and the other end of the at least one capillary pipe (39) is connected to the speed regulating apparatus (18);
   at least one irrigator (17) is provided on each of the at least one capillary pipes (39);
   wherein the magnetizer (9) comprises: a pipe coil and a magnetization generating apparatus;
   the pipe coil is wound on the magnetized pipe (7);
   one end of the pipe coil is connected to one end of the magnetization generating apparatus, and the other end of the pipe coil is connected to the other end of the magnetization generating apparatus; and
   the first copper valve (6) is configured to adjust flow rate changes through the at least one main pipe.

2. The magnetization control apparatus for preventing clogging of a drip irrigation system irrigator according to claim 1, wherein the magnetization control apparatus further comprises: a solar panel (8);
   the magnetization control apparatus is connected to the solar panel (8); and
   the solar panel (8) is configured to: provide electrical energy for the magnetization generating apparatus.

3. The magnetization control apparatus for preventing clogging of a drip irrigation system irrigator according to claim 1, wherein the magnetizer (9) is: a DC pulse variable frequency magnetizer;
   an input voltage of the DC pulse variable frequency magnetizer is: 220V/50 Hz, an output voltage is: 12-36V, an output current is: 1 A-6 A, an applicable temperature is: −10-55° C., an adjustable frequency range is: 0-120 kHz, and an effective distance is 50-1000 m;
   a number of coil turns of the pipe coil is 20-60 turns, a material of the magnetized pipe (7) is: PVC pipe, and the pipe coil is wound on the magnetized pipe (7) in a flat winding approach; and
   a pipe diameter of the PVC pipe is: 63 mm-90 mm.

4. The magnetization control apparatus for preventing clogging of a drip irrigation system irrigator according to claim 1, wherein the magnetization generating apparatus comprises: a microcontroller, a reset circuit, a display circuit, a Hall high-speed current detection sensor, a PWM pulse generating circuit, a pulse power amplifier circuit, a voltage regulator circuit and a DC power supply module;
   the microcontroller is connected to the reset circuit, the display circuit, the Hall high-speed current detection sensor, the PWM pulse generating circuit, and the voltage regulator circuit;
   the pulse power amplifier circuit is connected to the PWM pulse generating circuit, the DC power supply module and the pipe coil;
   the voltage regulator circuit is connected to the DC power supply module;
   the Hall high-speed current detection sensor is installed on the pipe coil;
   the PWM pulse generating circuit generates a PWM pulse signal;
   the pulse power amplifier circuit amplifies a power of the PWM pulse signal generated by the PWM pulse generating circuit again, and the amplified pulse signal acts on the magnetized pipe (7) through the external pipe coil;
   the display circuit is capable of displaying a frequency and a current waveform output by the magnetizer (9);
   the DC power supply module provides energy for the pulse power amplifier circuit and the microcontroller to ensure safe operation of the devices; and
   the voltage regulator circuit is configured to stabilize an input voltage into the magnetizer (9) and an output voltage from the magnetizer (9).

5. The magnetization control apparatus for preventing clogging of a drip irrigation system irrigator according to claim 4, wherein the magnetization generating apparatus further comprises: a casing, a button, a first pulse coil line interface (27), a second pulse coil line interface (28), a switch key (35) and a power line interface (36);

the button, the first pulse coil line interface (27), the second pulse coil line interface (28), the switch key (35) and the power line interface (36) are installed on the casing;

the power line interface (36) connects the switch key (35) with an external power supply;

one end of the pipe coil is connected to the pulse power amplifier circuit through the first pulse coil line interface (27), and the other end of the pipe coil is connected to the pulse power amplifier circuit through the second pulse coil line interface (28);

the DC power supply module is connected to the switch key (35);

the display circuit is a display screen (31);

the display screen (31) is capable of realizing touch screen setting;

the button is connected to the microcontroller;

the microcontroller uses a single-chip microcomputer as a core, processes information through a software program set in a memory, adjusts parameters with the display circuit and the button, performs high-speed arithmetic processing on the received signal, and outputs a signal processing result to the PWM pulse generating circuit;

the Hall high-speed current detection sensor transmits a current waveform signal back to the single-chip microcomputer of the microcontroller for processing, and displays the signal on the display screen (31) at the same time;

the button comprises: an upward adjustment key (29), a downward adjustment key (30), a confirmation key (32), a backspace key (33), a mode change key (34), a start key and a stop key;

the upward adjustment key (29) is configured to: turn up an evaluation index; and the downward adjustment key (30) is configured to: turn down the evaluation index.

6. The magnetization control apparatus for preventing clogging of a drip irrigation system irrigator according to claim 1, wherein the speed regulating apparatus (18) comprises: a second copper valve (19), a third valve (20), a fourth valve (21), a flow meter (22) and a fifth valve (23); and the other ends of the several capillary pipes (39) are connected to one end of the second copper valve (19); the other end of the second copper valve (19) is connected to one end of the third valve (20) and one end of the fourth valve (21); the other end of the third valve (20) is connected to one end of the fifth valve (23), the other end of the fourth valve (21) is connected to one end of the flow meter (22), and the other end of the flow meter (22) is connected to the other end of the fifth valve (23).

7. A method for preventing clogging of a drip irrigation system irrigator using a magnetization control apparatus, comprising steps as follows:

step one, using the drip irrigation system of claim 1, pumping irrigation water from the water source project (1) through the first water pump (2), first passing through the drip irrigation head control hub (3), and then entering the pool (4);

step two: pumping the irrigation water through the second water pump (5) again, first flowing through the first copper valve (6), and then entering the magnetized pipe (7);

in the magnetization control apparatus, by observing a flow rate displayed by the flow rate monitor (10), adjusting the first valve (11) so that the flow rate displayed by the flow rate monitor (10) is: 1.2-1.6 m/s;

step three: the irrigation water after treated by the DC pulse variable frequency magnetizer returning to the pool (4) through the flow rate monitor (10) and the first valve (11) in turn;

monitoring a colony count, an electrical conductivity, dissolved oxygen and a surface tension of the irrigation water by the sensor (12) in the pool (4);

the irrigation water being subjected to cyclic magnetization treatment by the magnetization control apparatus, and the sensor (12) feeding back monitored data to the automatic control apparatus (13), when water quality of the irrigation water meets water quality requirements entering the capillary pipes (39), the automatic control apparatus (13) turning off the second water pump (5) and stopping the cyclic magnetization treatment;

wherein the water quality requirements of the irrigation water after the cyclic magnetization treatment are: the colony count is less than $2\times10^3$ cfu/ml, the electrical conductivity is less than 4 ds/m, the dissolved oxygen is more than 5.0 mg/L, and a range of the surface tension is: 25-50 mN/m;

step four: the automatic control apparatus (13) controlling the third water pump (14) to turn on;

pumping the irrigation water after the cyclic magnetization treatment from the pool (4) through the third water pump (14), and further filtering through the mesh filter (15);

the irrigation water entering the branch pipe (38) and the capillary pipes (39) through the second valve (16) again; and the irrigation water flowing from the irrigators (17) for irrigation.

8. The method for preventing clogging of a drip irrigation system irrigator according to claim 7, wherein an operating pressure of the drip irrigation system is 0.07-0.12 Mpa; an irrigation frequency of the drip irrigation system is 3-10 d/time;

during operation of the drip irrigation system, flushing is performed every 50-60 hours;

steps for flushing are as follows:

S1. opening the second copper valve (19), the fourth valve (21) and the fifth valve (23), and closing the third valve (20);

S2. observing a flow rate in the pipe through the flow meter (22), and adjusting the second copper valve (19) so that a target flow rate displayed by the flow meter (22) is: 0.50-0.80 m/s;

S3. closing the fourth valve (21) and the fifth valve (23), opening the third valve (20), and flushing the capillary pipes (39) of the drip irrigation system for 5-10 minutes using the target flow rate; and S4. closing the second copper valve (19), increasing the operating pressure of the drip irrigation system to 0.15-0.20 MPa, and flushing the irrigators (17) of the drip irrigation system for 2-3 minutes.

9. The method for preventing clogging of a drip irrigation system irrigator according to claim 7, wherein a magnetic induction intensity of the DC pulse variable frequency magnetizer is: 500-800 mT, a sweep frequency range is: 20 Hz-60 kHz, a scanning period is: 1.2-1.5 s, and a carrier frequency is: 1.0-1.2 MHz;

a material of the pipe coil is: copper wire, and a cross-sectional area is: 0.5-1 mm2; and the mesh filter (15) is a 150-mesh filter.

10. The method for preventing clogging of a drip irrigation system irrigator according to claim 7, wherein an anti-clogging ability evaluation parameter ACA of the irrigators (17) is not less than 0.8, and the flow rate is 0.5-3.0 L·h-1;

the irrigators (17) are: chip irrigators;
the ACA is calculated according to formula (1), $$ACA = -13.16 \times A1/2/L - 0.33 \times W/D + 1.57 \qquad (1)$$

wherein, A is a cross-sectional area of a flow channel of the irrigator, L is a length of the flow channel of the irrigator, W is a width of the flow channel of the irrigator, and D is a depth of the flow channel of the irrigator.

11. The magnetization control apparatus for preventing clogging of a drip irrigation system irrigator according to claim 5, wherein the evaluation index is colony count, electrical conductivity, sterilization rate, surface tension, dissolved oxygen, or redox potential of irrigation water.

* * * * *